US009497008B2

(12) United States Patent
Tabet et al.

(10) Patent No.: US 9,497,008 B2
(45) Date of Patent: Nov. 15, 2016

(54) SYSTEM AND METHOD FOR SEARCHING FOR GRANTS AND ASSIGNMENTS IN A PDCCH

(71) Applicant: APPLE INC., Cupertino, CA (US)

(72) Inventors: Tarik Tabet, San Jose, CA (US); Vinay Majjigi, Santa Clara, CA (US); Syed Aon Mujtaba, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 51 days.

(21) Appl. No.: 14/500,481

(22) Filed: Sep. 29, 2014

(65) Prior Publication Data

US 2015/0092711 A1 Apr. 2, 2015

Related U.S. Application Data

(60) Provisional application No. 61/883,309, filed on Sep. 27, 2013.

(51) Int. Cl.
*H04L 5/00* (2006.01)
*H04L 1/00* (2006.01)

(52) U.S. Cl.
CPC ........... *H04L 5/0053* (2013.01); *H04L 1/0042* (2013.01); *H04L 1/0045* (2013.01); *H04L 1/0061* (2013.01); *H04L 1/0072* (2013.01)

(58) Field of Classification Search
None
See application file for complete search history.

(56) References Cited

U.S. PATENT DOCUMENTS

| | | | | |
|---|---|---|---|---|
| 7,292,854 B2* | 11/2007 | Das | ...................... | H04W 48/12 370/320 |
| 2010/0254329 A1* | 10/2010 | Pan | ........................ | H04L 5/001 370/329 |
| 2010/0322132 A1* | 12/2010 | Ramakrishna | ........ | H04L 1/0038 370/312 |
| 2011/0064042 A1* | 3/2011 | Kim | ..................... | H04L 5/1469 370/329 |
| 2011/0085458 A1* | 4/2011 | Montojo | ................ | H04L 1/0038 370/252 |
| 2012/0021756 A1* | 1/2012 | Kwon | .................... | H04L 5/0053 455/450 |
| 2012/0044899 A1* | 2/2012 | Kwon | ..................... | H04L 5/001 370/329 |
| 2012/0218964 A1* | 8/2012 | Park | ....................... | H04B 7/155 370/329 |
| 2013/0016655 A1* | 1/2013 | Heo | ......................... | H04L 5/001 370/328 |
| 2013/0016672 A1* | 1/2013 | Yang | ...................... | H04L 1/0046 370/329 |
| 2013/0114565 A1* | 5/2013 | Chen | ..................... | H04L 5/0053 370/330 |
| 2014/0334440 A1* | 11/2014 | Wong | ................ | H04W 36/0011 370/331 |
| 2015/0003311 A1* | 1/2015 | Feuersaenger | .... | H04W 52/0225 370/311 |
| 2015/0373668 A1* | 12/2015 | Lee | ...................... | H04W 72/042 370/329 |

FOREIGN PATENT DOCUMENTS

FI     WO 2008097177 A2 *  8/2008  ........... H04L 1/0035

* cited by examiner

*Primary Examiner* — Ayaz Sheikh
*Assistant Examiner* — Tarell Hampton
(74) *Attorney, Agent, or Firm* — Fay Kaplun & Marcin, LLP (57) ABSTRACT

A method performed at a network component for indicating a number of grants in a transmission and a corresponding method performed at a station to limit a search for the grants to the number indicated in the transmission. In one embodiment, the transmission includes physical downlink control channel (PDCCH) information and modified cyclic redundancy check (CRC) information, the modified CRC information being generated from CRC information for the PDCCH information and a modifier representing a number of grants. The station determines the number of grants from the modified CRC information, performs a search for a first grant within the PDCCH information and terminates the search upon identifying the first grant, when the number of grants is the first number.

19 Claims, 4 Drawing Sheets

SYSTEM AND METHOD FOR SEARCHING FOR GRANTS AND ASSIGNMENTS IN A PDCCH

PRIORITY CLAIM/INCORPORATION BY REFERENCE

This application claims priority to U.S. Provisional Application 61/883,309 entitled "System and Method for Searching for Grants in a PDCCH," filed on Sep. 27, 2013, the entirety of which is incorporated herein by reference.

BACKGROUND INFORMATION

A station may establish a wireless connection to a wireless communications network using a variety of different hardware and software. During the connection with the network, the station may receive information indicating a number of grants allocated thereto. For example, the station may be given an uplink grant, a downlink assignment, both grants, or neither grant.

SUMMARY

In one exemplary embodiment, a method is performed by a station. The method includes receiving a transmission from a base station of a Long Term Evolution (LTE) network, the transmission including physical downlink control channel (PDCCH) information and modified cyclic redundancy check (CRC) information, the modified CRC information being generated from CRC information for the PDCCH information and a modifier representing a first number or a second number of grants, the first number indicating a first grant type only or a second grant type only is included in the PDCCH information, the second number indicating the first and second grant types are included in the PDCCH information. The method also includes determining the number of grants from the modified CRC information, performing a search for a first grant within the PDCCH information, and terminating the search upon identifying the first grant, when the number of grants is the first number.

In another exemplary embodiment, a method is performed by a base station. The method includes generating cyclic redundancy check (CRC) information for physical downlink control channel (PDCCH) information for a wireless station connected to a Long Term Evolution (LTE) network, the CRC information having a predetermined length of data, determining grant information for the wireless station, the grant information being one of a first number and a second number of grants, the first number indicating a first grant type only or a second grant type only, the second number indicating the first and second grant types, generating modified CRC information based on the CRC information and a modifier indicative of the grant information, the modified CRC information maintaining the predetermined length of data of the CRC information, and transmitting the PDCCH information and the modified CRC information to the wireless station.

In a further exemplary embodiment, a station includes a transceiver and a processor. The transceiver is configured to establish a connection to a network, the transceiver further configured to receive a transmission from the network, the transmission including transmission including payload information and modified cyclic redundancy check (CRC) information, the modified CRC information being generated from CRC information for the payload information and a modifier representing a first number or a second number of grants within the payload information, the first number indicating a first grant type only or a second grant type only is included in the payload information, the second number indicating the first and second grant types are included in the payload information. The processor is coupled to a memory and is programmed to determine the number of grants from the modified CRC information, perform a search for a first grant within the payload information and terminate the search upon identifying the first grant, when the number of grants is the first number.

DETAILED DESCRIPTION

The exemplary embodiments may be further understood with reference to the following description and the related appended drawings, wherein like elements are provided with the same reference numerals. The exemplary embodiments are related to a system and method for searching for grants in physical downlink control channel (PDCCH) information. Specifically, in a Long Term Evolution (LTE) network, a component (e.g., an eNodeB (hereinafter "eNB")) may transmit a transmission including the PDCCH information along with a cyclic redundancy check (CRC). The exemplary system and method further modifies the CRC with a CRC mask to generate a modified CRC that is transmitted. The modified CRC may be adapted to indicate the number of grants included within the PDCCH information. For example, the number of grants may be for a single grant only (e.g., uplink grant only or downlink assignment only) or may be for a dual grant (e.g., an uplink grant and a downlink assignment). When only a single grant is included in the PDCCH information, a station that decodes the transmission from the eNB may terminate a search once this single grant has been identified. Accordingly, the station may conserve power by not wasting additional power required for processing to search for a further grant that does not exist. The PDCCH information, the LTE network, the eNB, the transmission, the CRC, the modified CRC, the CRC mask, the grants, the search, and related methods will be described in further detail below.

Those skilled in the art will understand that it is common to refer to uplink (UL) grants and downlink (DL) assignments. It should be noted that throughout this description, these terms are used interchangeably. Thus, the term "grant" should be understood to encompass both a UL grant and a DL assignment. Similarly, the term "assignment" should be understood to include both a DL assignment and a UL grant.

Throughout this description, the exemplary embodiments will be described with reference to an LTE communication network. However, it will be understood by those skilled in the art that the exemplary embodiments may be applicable to other types of wireless communications networks in accordance with the principles described herein. The exemplary embodiments may be applied to any wireless communication network that includes a network component that transmits communications signals including grant information.

A station may establish a connection to a wireless communications network via a base station (e.g., an eNB in LTE networks). To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. While connected to the network, the eNB may transmit the requisite information in a transmission to the station such that the wireless properties may be determined. For example, given a frame with a duration of 10 milliseconds (ms), each subframe of the frame may have a duration of 1 ms. One or more of the subframes that are transmitted to the station may include PDCCH information. The eNB may further be configured to include an error check such as a CRC in the transmission such that the station may determine whether the PDCCH information was properly received. Therefore, the PDCCH information may be decoded from the transmission and checked for errors using the included CRC. In this manner, the station will know if it has received the proper requisite information.

Upon decoding the PDCCH information, the payload relating to the control channel information may be utilized in determining the wireless properties. Within the PDCCH information, grant and assignment information may also be included which indicates whether the station is given permission for an uplink, a downlink, or both uplink and downlink. In LTE networks, the eNB may assign the uplink grants and downlink resources and indicate such information within the PDCCH information. This grant information may relate specifically to the subframe in which the PDCCH information is received. Those skilled in the art will understand that the actual uplink grant is transmitted by the station on the physical uplink shared channel (PUSCH) while the actual downlink resource is transmitted by the eNB on the physical downlink shared channel (PDSCH). In a given search space of the PDCCH information, the station is required to determine whether one or two grants are included. To guarantee that these grants have been allocated or not for a given subframe, the station is required to blindly search the entire search space of the PDCCH information regardless of whether only one grant is included. For example, when only one grant is included, despite having already found this grant in the PDCCH information, the station continues to search the remainder of the search space to determine whether a second grant has been included. Thus, the station is using power and processing resources to search for a grant that does not exist. It should be noted that when the station is allocated zero grants, there may not be any transmission to the station.

The exemplary systems and methods provide a manner for the station to conserve power by terminating a search when only one grant is included in the PDCCH information by modifying the CRC information that is part of the transmission to the station. As will be described in greater detail below, the CRC information will include the number of grants in the PDCCH. When the station performs the search of the PDCCH for the grant information, the station will know the number of grants for which it is searching. When the station has found the number of grants, the station may terminate the search, thereby saving the power and processing resources of the station.

Figure 1:
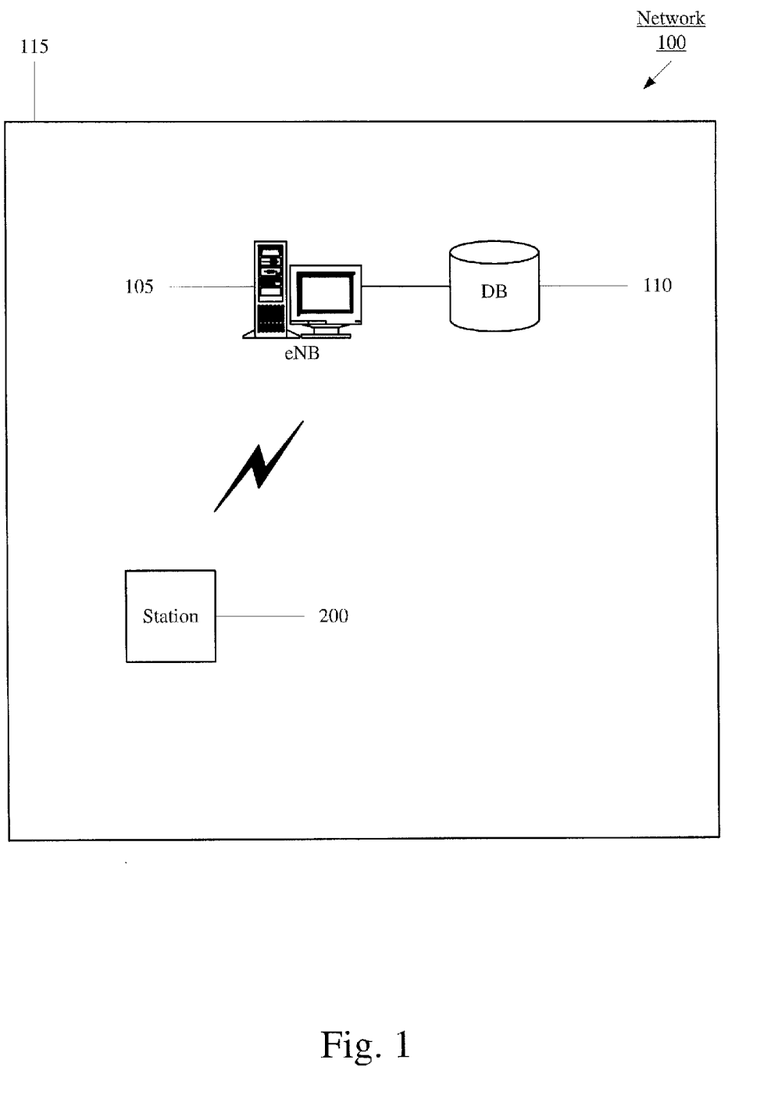
FIG. 1 shows an exemplary network utilizing a modified transmission indicative of grants.

FIG. 1 shows an exemplary network 100 utilizing a modified transmission indicative of grants. The network 100 may be a LTE network under the 3GPP specification. Accordingly, the network 100 may operate in the above described manner in which PDCCH information is included in each subframe that is transmitted to a station 200 such that the PDCCH payload used for determining the wireless properties and grant information included in the PDCCH information may be utilized for that subframe. The network 100 may include an eNB 105 and a database 110 and have an operating area 115. As the station 200 is within the operating area 115, a wireless connection may be established between the eNB 105 and the station 200. It should be noted that the network 100 may include further components associated with the core network. The functionalities described herein as being performed by the eNB 105 may also be performed by these other components of the core network.

The eNB 105 may be configured to determine the information included in a transmission to the station 200. Specifically, the eNB 105 may generate the transmission to include the PDCCH information and a CRC or a modified CRC. The payload information may be determined respective of a single station such as the station 200. The eNB 105 may also generate transmissions for further stations (not shown) that have established connections with the eNB 105.

The eNB 105 may also determine the grant information for each station. The grant information may be for an uplink grant, a downlink assignment, both an uplink and a downlink assignment, or neither for the subframe in which the transmission of the PDCCH information is related. The grant information relating to one grant or both grants may also be included within the PDCCH information. Accordingly, the PDCCH information may have a search space in which the grant information is included. As will be described in further detail below, the station 200 may perform a search within the search space of the PDCCH to identify the grant information that may again be for an uplink grant, a downlink assignment, or both an uplink and a downlink assignment.

The eNB 105 may also generate CRC information for the PDCCH information. The CRC information may be utilized during a decoding of the PDCCH information to determine whether the station 200 has properly received the PDCCH information. Accordingly, the PDCCH information and the CRC information are included in the transmission to the station 200.

According to the exemplary embodiments, the eNB 105 may further be configured to modify the CRC information. Specifically, modified CRC information may be transmitted (in lieu of the CRC information) within the transmission to the station 200. Initially, the modified CRC information may include the CRC information. The eNB 105 may utilize a CRC mask applied to the CRC information in order to generate the modified CRC information. The CRC mask may be used to indicate whether the PDCCH information includes a single grant (uplink grant only or downlink assignment only) or a double grant (uplink grant and downlink assignment). The CRC mask may be an indication signaled by an XOR operation in a predetermined bitmap to the CRC information. On the device side, the station 200 may remove the CRC mask from the modified CRC information to create the CRC information. Thus, when there is a single grant, the eNB 105 may generate one modified CRC information appended to the grant itself included in the PDCCH information search space. When there is a dual grant, the eNB 105 may generate two modified CRC information that are each appended to both grants that are both included in the PDCCH information search space.

The CRC information may be generated by the eNB 105 using a known CRC generation polynomial based upon the PDCCH information. Thus, the CRC information may be a set of CRC bits. In a specific example, the CRC information may be 16 bits in length. The CRC mask may have the same length as the CRC information such that the modified CRC information has the same length as the CRC information. For example, when the CRC mask is to indicate that the PDCCH information includes one grant, the CRC mask may be a 16 bit code such as <0,1,0,1,0,1,0,1,0,1,0,1,0,1,0,1>. In another example, when the CRC mask is to indicate that the PDCCH information includes both grants, the CRC mask may be a 16 bit code such as <1,0,1,0,1,0,1,0,1,0,1,0,1,0,1,0>. With the 16 bit code of the CRC information and the 16 bit code of the CRC mask, the XOR operation may be performed to generate the modified CRC information. Once the eNB 105 has generated the information bits of the PDCCH information and the modified CRC information (based upon the CRC information and the CRC mask), the eNB 105 may transmit this data to the station 200.

It should again be noted that if the station 200 has not been allocated any grants (i.e., zero grants), the eNB 105 may not transmit any information bits to the station 200.

Figure 2:
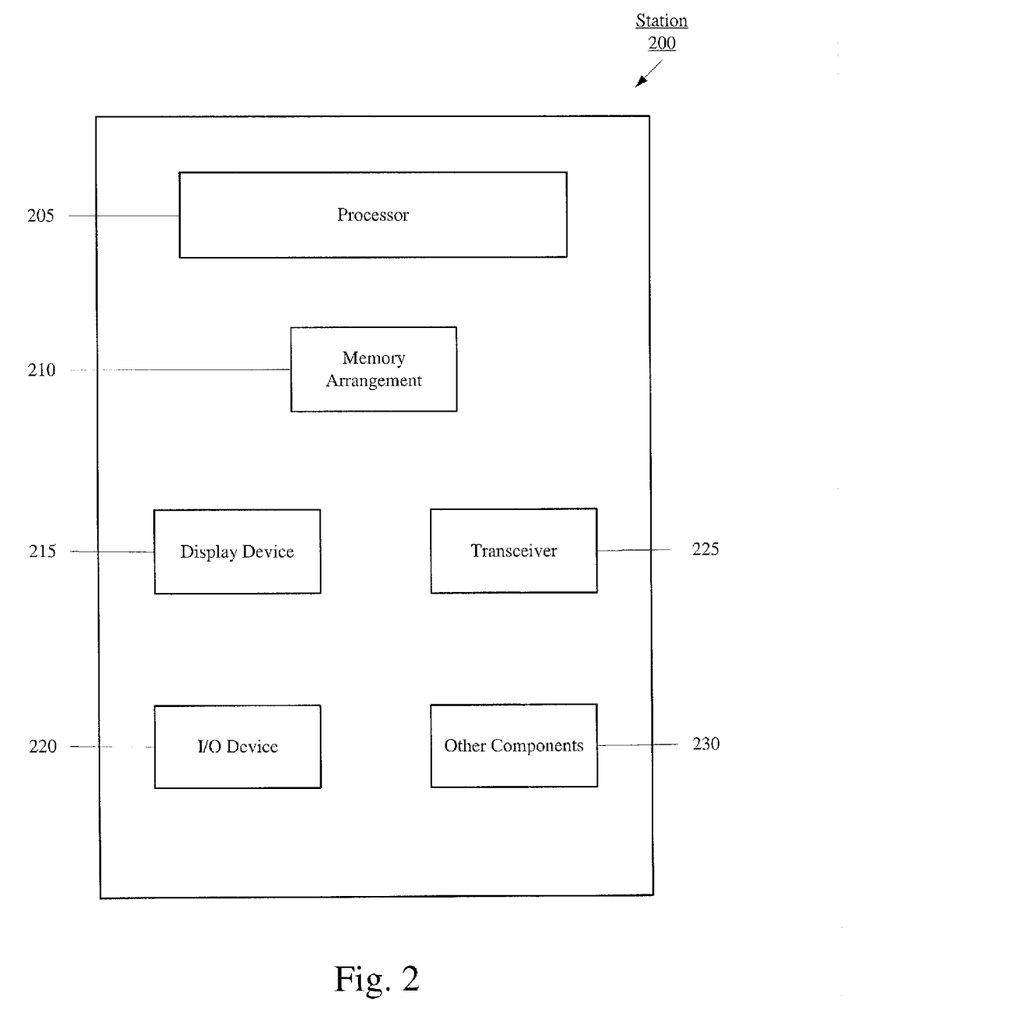
FIG. 2 shows the exemplary station of FIG. 1 receiving the modified transmission while connected to the network.

FIG. 2 shows the exemplary station 200 of FIG. 1 receiving the modified transmission while connected to the network. Specifically, the station 200 may exchange data with the eNB 105 of the LTE wireless network and a transmission therefrom. The station 200 may represent any electronic device that is configured to perform wireless functionalities. For example, the station 200 may be a portable device such as a phone, a smartphone, a tablet, a phablet, a laptop, etc. In another example, the station 200 may be a stationary device such as a desktop terminal. The station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the station 200 to other electronic devices, etc.

The processor 205 may be configured to execute a plurality of applications of the station 200. For example, the applications may include a web browser when connected to a communication network via the transceiver 225. In a specific exemplary embodiment, the processor 205 may execute a decoding application for the transmission from the eNB 105. The decoding application may decode the transmission to extract the PDCCH information and the modified CRC information. Specifically, the decoding application may search for a grant within the PDCCH information search space and upon detecting this grant, the modified CRC information may be extracted. The decoding application may then decode the modified CRC information to extract the CRC information and the CRC mask. The memory 210 may be a hardware component configured to store data related to operations performed by the station 200. Specifically, the memory 210 may store the PDCCH information, the CRC information, and the CRC mask. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through the LTE network 100 based upon an operating frequency of the network. The transceiver 225 may operate on a variety of different frequencies or channels (e.g., set of consecutive frequencies). Thus, an antenna (not shown) coupled with the transceiver 225 may enable the transceiver 225 to operate on the various frequencies. The transceiver 225 may enable the station 100 to transmit and receive data related to the various applications executed by the processor 205. In order for this data related to the applications to be transmitted/received, the wireless properties must be properly configured. Accordingly, the transceiver 225 may also be used for background communications with the eNB 105. Specifically, the transmission including the PDCCH information and the modified CRC information may be received via the transceiver 225.

The station 200 may receive the transmission from the eNB 105 for each subframe in a known specification indicating a schedule of transmissions. As discussed above, the transmission may include the PDCCH information as well as the modified CRC information. Upon receiving the transmission, the decoding application executed by the processor 205 may decode the transmission. By decoding the transmission, the PDCCH information may be extracted. The decoding application may decode the PDCCH information and search for a valid grant within the PDCCH search space. Accordingly, upon finding a grant, the decoding application may extract the modified CRC appended to this grant. When the modified CRC information is included in the transmission, the decoding application may apply a reverse XOR operation to extract the CRC information and the CRC mask. The CRC information may be used to determine whether the information bits of the PDCCH information have been properly received. For example, a reverse operation of the CRC generation polynomial used to generate the CRC information may be used such that a zero remainder indicates that the PDCCH information is correct. However, if the remainder is non-zero, the information bits of the PDCCH information may be corrupted in some manner. The decoding application may discard the information in this case.

When the error check has been performed and the PDCCH information has been determined to be correct, the station 200 may extract the control information included in the PDCCH information such as that related to the wireless properties. When the CRC mask has been determined, the station 200 may initially determine what the CRC mask indicates. Specifically, the station 200 may determine whether the CRC mask indicates a single grant or a dual grant. When the CRC mask indicates a dual grant, the station 200 may continue the search until the other grant has been found. However, when the CRC mask indicates a single grant, the station 200 may terminate the search as the CRC mask indicates only a single grant has been included in the PDCCH information and this grant has already been found. Subsequently, the station 200 may determine the type that the identified single grant is related.

Figure 3:
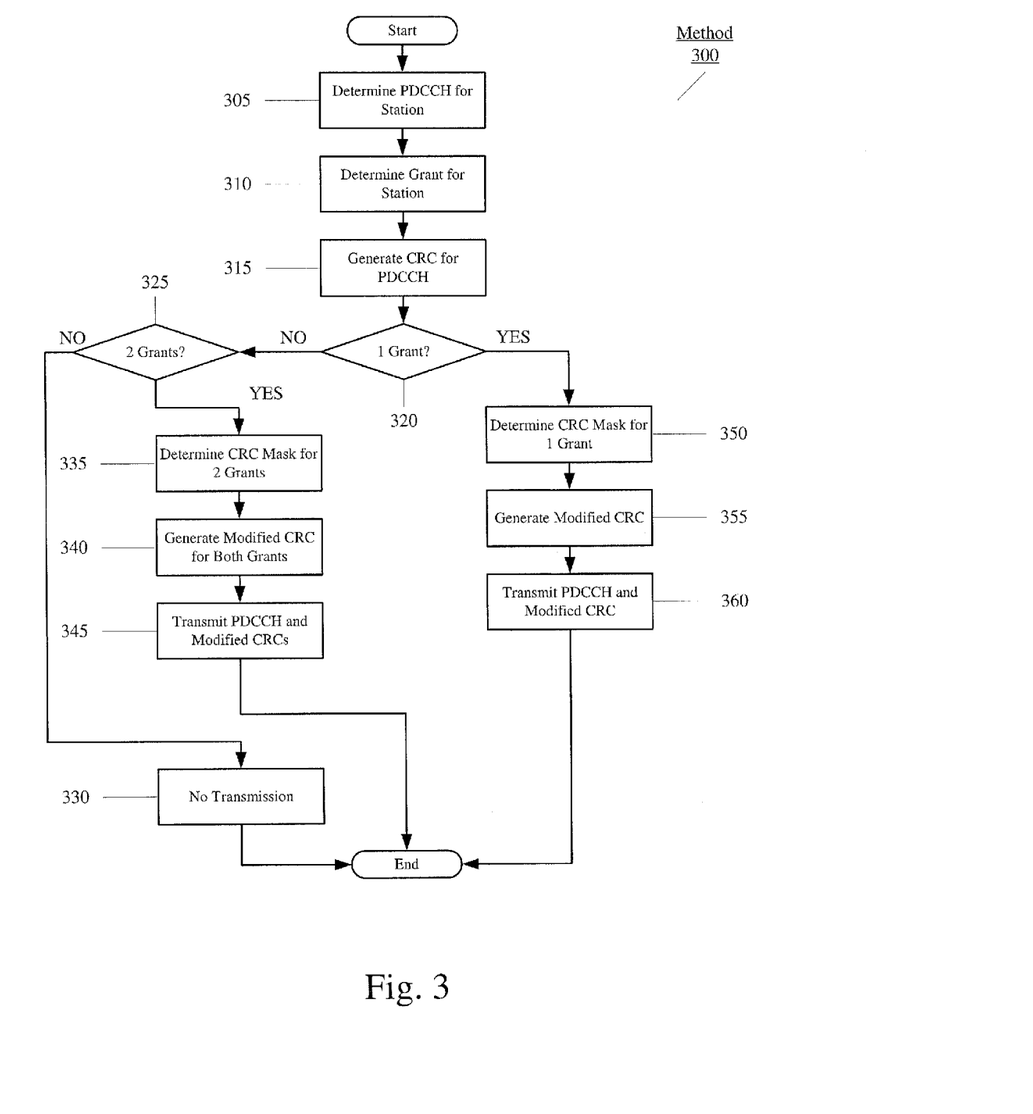
FIG. 3 shows a first exemplary method for generating the modified transmission.

FIG. 3 shows a first exemplary method 300 for generating the modified transmission. The method 300 relates to a server side operation of the LTE network 100 in which the eNB 105 generates the transmission for the station 200. The method 300 will be described with reference to the network 100 of FIG. 1.

In step 305, the eNB 105 determines the PDCCH information for the station 200. In step 310, the eNB 105 determines the grant information for the station 200 for the subframe in which the PDCCH information relates. For example, the station 200 may be allocated an uplink grant only, a downlink assignment only, both an uplink grant and a downlink assignment, or neither. The eNB 105 may incorporate the grant information in the PDCCH information when there is one grant or both grants. The eNB 105 may subsequently generate information bits for the PDCCH information including the grant information. In step 315, the eNB 105 generates the CRC information for the PDCCH information. As described above, the eNB 105 may utilize a CRC generation polynomial to generate the CRC information.

In step 320, a determination is made whether the grant information for the station 200 is for one grant only. If the station 200 has been allocated both grants or neither grant, the method 300 continues to step 325. In step 325, a determination is made whether the station 200 has been allocated both grants. If the station 200 has been allocated zero grants, the method 300 continues to step 330. In step 330, there is no transmission to the station 200.

Returning to step 325, if the station 200 has been allocated both grants, the method 300 continues to step 335. In step 335, the eNB 105 determines the CRC mask to be applied to the CRC information. As discussed above, the CRC mask may be a set of 16 bits, which matches a length of the CRC information. The CRC mask for both grants may also be unique such that the station 200 may be aware that both grants are included in the PDCCH information when this particular CRC mask is identified. In step 340, the eNB 105 generates the modified CRC information by applying this CRC mask to the CRC information. Thus, in step 345, the eNB 105 transmits the transmission to the station 200 including the PDCCH information and the modified CRC information that indicates that both grants are included in the PDCCH information. Specifically, each grant is appended to the modified CRC information indicating the dual grant.

Returning to step 320, if the station 200 has been allocated only one grant, the method 300 continues to step 350. In step 350, the eNB 105 determines the CRC mask to be applied to the CRC information. Again, the CRC mask may have a length corresponding to the length of the CRC information and the CRC mask may be unique such that the station 200 may be aware that one grant is included in the PDCCH information when this particular CRC mask is identified. In step 355, the eNB 105 generates the modified CRC information by applying this CRC mask to the CRC information. Thus, in step 360, the eNB 105 transmits the transmission to the station 200 including the PDCCH information and the modified CRC information that indicates that only a single grant is included in the PDCCH information. Specifically, the one grant is appended the modified CRC information indicating the single grant.

Figure 4:
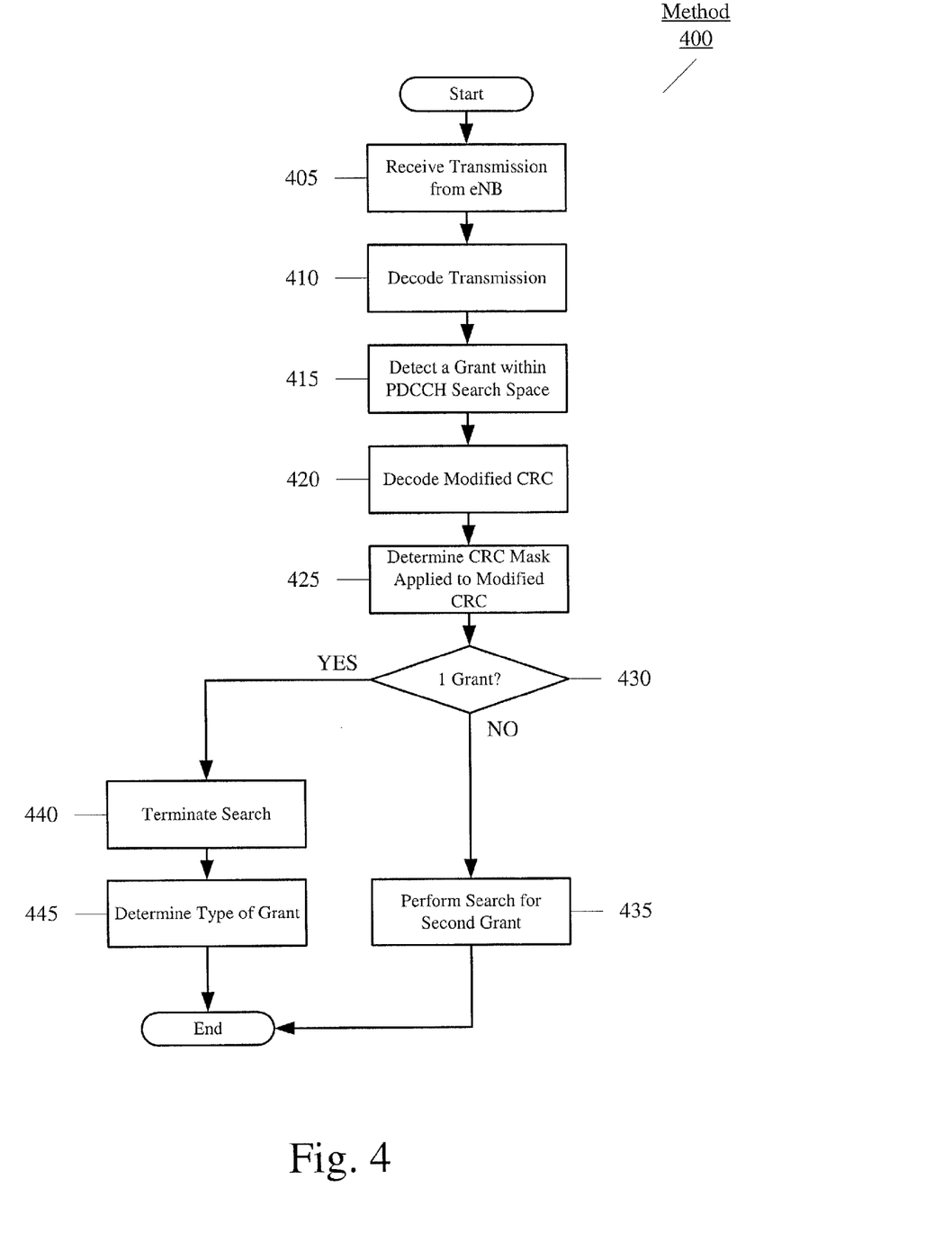
FIG. 4 shows a second exemplary method for decoding the modified transmission.

FIG. 4 shows a second exemplary method 400 for decoding the modified transmission. The method 400 relates to a station side operation in which the station 200 receives the transmission from the eNB 105. The method 400 will be described with reference to the station 200 of FIG. 2.

In step 405, the station 200 receives the transmission from the eNB 105. As described above, the transceiver 225 may be used to transmit data related to applications executed by the processor 205. Among this data may be the transmission from the eNB 105. In step 410, the decoding application executed by the processor 205 may decode the transmission. As described above, the transmission may be decoded to extract the PDCCH information. It should again be noted that if the station 200 has been allocated zero grants, the eNB 105 does not transmit anything, thereby the station 200 not receiving any transmission.

In step 415, the decoding application blindly searches the PDCCH information search space to detect a valid grant included therein. Since the station 200 has received the transmission from the eNB 105, there is either a single grant or a dual grant included in the PDCCH information search space. Upon finding a grant, in step 420, the decoding application decodes the modified CRC information that is appended thereto.

In step 425, the decoding application determines the CRC mask applied to the modified CRC information. As discussed above, the decoding application may perform an opposite XOR operation to extract the CRC information and the CRC mask used to generate the modified CRC information. In step 430, the decoding application determines whether the CRC mask indicates one grant.

If the CRC mask indicates a dual grant, the method 400 continues to step 435. In step 435, the decoding application is aware that there is a further grant to find. Thus, the decoding application continues the search within the remaining PDCCH information search space to find the second grant.

Returning to step 430, if the CRC mask indicates a single grant, the method 400 continues to step 440. In step 440, the decoding application terminates the search. That is, the decoding application is aware that there is only one grant included within the PDCCH information search space and that this grant has already been found (e.g., step 415). Therefore, the remaining PDCCH search space does not require a search to be performed. In step 445, the decoding application may determine the type of grant.

It should be noted that the method 400 may include further steps. For example, the method 400 may includes steps related to using the CRC information to determine whether the PDCCH information has been properly received in the transmission.

In the above exemplary embodiments, it was described that two different CRC masks may be used to identify when a PDCCH includes one or multiple grants or assignments. In another exemplary embodiment, only one CRC mask may be defined. This single CRC mask may be used when there is only one UL grant or DL assignment. Whereas, if the PDCCH includes both an uplink grant and a downlink assignment, then no mask is applied to the CRC. In this manner, the station, when it decodes the PDCCH, will understand that if a mask is applied, there is either an uplink grant or a downlink assignment in the PDCCH, i.e., only one grant or assignment. In contrast, if no mask is applied, the station will understand that the PDCCH includes both an uplink grant and a downlink assignment.

In this exemplary embodiment, the station, when it is decoding the received PDCCH, will attempt the decoding with and without the defined CRC mask. As described above, when the station is decoding the PDCCH with the CRC, the inverse operation of the CRC normally results in either a zero remainder, indicting the decoding was successful, or a non-zero remainder, indicating the decoding was not successful. Thus, if the station attempts the decode with and without the defined CRC mask and one way is successful and the other way is not successful, the station will be confident that the successful way is the correct way. In this manner, the station will understand whether the CRC mask was applied to PDCCH. It should also be noted that this exemplary embodiment may be applied in the opposite manner, i.e., the CRC mask is applied when there is both an uplink grant and downlink assignment and the CRC mask is not applied when there is only one of an uplink grant or a downlink assignment.

The exemplary embodiments provide a system and method of terminating a search for a further grant in PDCCH information when a modified CRC information has a CRC mask applied thereto indicates that only a single grant is included in the PDCCH information. In this manner, power may be conserved as the blind search for both types of grants in the search space of the PDCCH information may be terminated early when only a single grant is included in the PDCCH information and that grant has already been found. The eNB of the LTE network may generate a transmission that includes the PDCCH information for a subframe as well as the modified CRC information. The station that receives this transmission may determine the number of grants included in the PDCCH information from decoding the CRC mask used to create the modified CRC information.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a station:
      receiving a transmission from a base station of a Long Term Evolution (LTE) network, the transmission including physical downlink control channel (PDCCH) information and modified cyclic redundancy check (CRC) information, the modified CRC information being generated from CRC information for the PDCCH information and a modifier representing a first number or a second number of grants, the first number indicating a first grant type only or a second grant type only is included in the PDCCH information, the second number indicating the first and second grant types are included in the PDCCH information;
      determining the number of grants from the modified CRC information;
      performing a search for a first grant within the PDCCH information; and
      terminating the search upon identifying the first grant, when the number of grants is the first number.

2. The method of claim 1, further comprising:
   continuing the search for a second grant, when the number of grants is the second number.

3. The method of claim 1, wherein the first grant type is an uplink grant and the second grant type is a downlink assignment.

4. The method of claim 1, wherein the modifier is a mask that is applied to the CRC information for the PDCCH information.

5. The method of claim 4, wherein the mask has the same length as the CRC information for the PDCCH information.

6. The method of claim 5, wherein the length is 16 bits.

7. The method of claim 4, wherein the mask is decoded after the first grant is found.

8. The method of claim 1, further comprising:
   determining whether the first grant is the first grant type or the second grant type.

9. The method of claim 1, further comprising:
   decoding the transmission from the base station, wherein the decoding is based on the CRC information for the PDCCH information.

10. A method, comprising:
    at a base station:
       generating cyclic redundancy check (CRC) information for physical downlink control channel (PDCCH) information for a wireless station connected to a Long Term Evolution (LTE) network, the CRC information having a predetermined length of data;
       determining grant information for the wireless station, the grant information being one of a first number and a second number of grants, the first number indicating a first grant type only or a second grant type only, the second number indicating the first and second grant types;
       generating modified CRC information based on the CRC information and a modifier indicative of the grant information, the modified CRC information maintaining the predetermined length of data of the CRC information; and
       transmitting the PDCCH information and the modified CRC information to the wireless station.

11. The method of claim 10, wherein the modifier is a mask that is applied to the CRC information for the PDCCH information.

12. The method of claim 11, wherein the mask is a first mask when the grant information is the first number and a second mask when the grant information is the second number.

13. The method of claim 11, wherein the generating the modified CRC information includes:
    performing an XOR operation using the CRC information and the mask.

14. A station, comprising:
    a transceiver configured to establish a connection to a Long Term Evolution (LTE) network, the transceiver further configured to receive a transmission from the LTE network, the transmission including transmission including physical downlink control channel (PDCCH) information and modified cyclic redundancy check (CRC) information, the modified CRC information being generated from CRC information for the PDCCH information and a modifier representing a first number or a second number of grants within the PDCCH information, the first number indicating a first grant type only or a second grant type only is included in the PDCCH information, the second number indicating the first and second grant types are included in the PDCCH information; and
    a processor coupled to a memory, wherein the processor is programmed to:
       determine the number of grants from the modified CRC information;
       perform a search for a first grant within the PDCCH information; and
       terminate the search upon identifying the first grant, when the number of grants is the first number.

15. The station of claim 14, wherein the processor is further configured to:

continue the search for a second grant, when the number of grants is the second number.

16. The station of claim 14, wherein the first grant type is an uplink grant and the second grant type is a downlink assignment.

17. The station of claim 14, wherein the modifier is a mask that is applied to the CRC information for the PDCCH information and has the same length as the CRC information for the PDCCH information, wherein the mask is decoded after the first grant is found.

18. The station of claim 14, wherein the processor is further configured to:
   determine whether the first grant is the first grant type or the second grant type.

19. The station of claim 14, wherein the modifier representing the first number is no modifier, such that the modified CRC information is the same as the CRC information.

* * * * *